United States Patent
Dong et al.

(10) Patent No.: US 9,225,462 B2
(45) Date of Patent: Dec. 29, 2015

(54) METHOD, APPARATUS AND SYSTEM FOR TRANSMITTING AND RECEIVING CLIENT SIGNALS

(71) Applicant: Huawei Technologies Co., Ltd., Shenzhen, Guangdong (CN)

(72) Inventors: Limin Dong, Shenzhen (CN); Qiuyou Wu, Shenzhen (CN); Qiwen Zhong, Shenzhen (CN); Zhiying Yao, Shenzhen (CN); Maarten Vissers, Huizen (NL)

(73) Assignee: Huawei Technologies Co., Ltd., Shenzhen (CN)

( * ) Notice: Subject to any disclaimer, the term of this patent is extended or adjusted under 35 U.S.C. 154(b) by 129 days.

(21) Appl. No.: 14/180,096

(22) Filed: Feb. 13, 2014

(65) Prior Publication Data

US 2014/0161463 A1 Jun. 12, 2014

Related U.S. Application Data

(63) Continuation of application No. 12/721,338, filed on Mar. 10, 2010, now Pat. No. 8,693,480, which is a continuation of application No. PCT/CN2009/072449, filed on Jun. 25, 2009.

(30) Foreign Application Priority Data

Jun. 26, 2008 (CN) .......................... 2008 1 0111493

(51) Int. Cl.
*H04J 3/02* (2006.01)
*H04J 14/08* (2006.01)
*H04J 3/16* (2006.01)

(52) U.S. Cl.
CPC ............. *H04J 14/086* (2013.01); *H04J 3/1652* (2013.01); *H04J 3/1664* (2013.01)

(58) Field of Classification Search
CPC .............................. H04J 3/1352; H04J 3/1664
See application file for complete search history.

(56) References Cited

U.S. PATENT DOCUMENTS 7,742,502 B2 6/2010 Vissers et al.
7,826,741 B2 11/2010 Katagiri
(Continued)

FOREIGN PATENT DOCUMENTS

CN 1734986 A 2/2006
CN 1734990 A 2/2006
(Continued)

OTHER PUBLICATIONS

"G.709/Y.1331—Interfaces for the Optical Transport Network (OTN)," ITU-T Recommendation G.709/Y.1331, Mar. 2003, Telecommunication Standardization Sector of ITU, Geneva, Switzerland.
(Continued)

*Primary Examiner* — David Oveissi
(74) *Attorney, Agent, or Firm* — Leydig, Voit & Mayer, Ltd.

(57) ABSTRACT

The present invention provides a method, apparatus and system for transmitting and receiving a client signal. A client signal is mapped to a low-order ODU via a GFP scheme, wherein the low-order ODU is sized to M equal sized timeslots of a high-order OPUk, wherein the high-order OPUk is divided into N equal sized timeslots, wherein M is any one of a group from 1 to N; wherein if k=2, then N=8, if k=3, then N=32 and if k=4, then N=80. The low-order ODU with the client signal is mapped to M equal sized timeslots of the high-order OPUk via a GMP scheme; and an OTU with the high-order OPUk and overheads is formed, and then the OTU is transmitted.

12 Claims, 7 Drawing Sheets

(56) References Cited

U.S. PATENT DOCUMENTS

| | | |
|---|---|---|
| 7,894,482 B1 | 2/2011 | Wu et al. |
| 7,944,928 B2 | 5/2011 | Zou |
| 7,949,255 B2 | 5/2011 | Zou |
| 8,170,421 B2 | 5/2012 | Li |
| 2003/0048813 A1 | 3/2003 | Lahav et al. |
| 2005/0286521 A1 | 12/2005 | Chiang et al. |
| 2006/0104309 A1 | 5/2006 | Vissers et al. |
| 2006/0268944 A1 | 11/2006 | Xu |
| 2007/0076767 A1 | 4/2007 | Loprieno et al. |
| 2007/0076769 A1 | 4/2007 | Zou |
| 2007/0211750 A1 | 9/2007 | Li et al. |
| 2007/0248121 A1 | 10/2007 | Zou |
| 2008/0080860 A1 | 4/2008 | Katagiri |
| 2008/0107418 A1 | 5/2008 | Zhang |
| 2008/0181203 A1 | 7/2008 | Jones et al. |
| 2008/0219661 A1 | 9/2008 | Lanzone et al. |
| 2008/0279553 A1 | 11/2008 | Meagher et al. |
| 2009/0169204 A1 | 7/2009 | Meagher et al. |
| 2010/0054731 A1 | 3/2010 | Oltman et al. |
| 2013/0195458 A1* | 8/2013 | Luo et al. .................. 398/66 |

FOREIGN PATENT DOCUMENTS

| | | |
|---|---|---|
| CN | 1773898 A | 5/2006 |
| CN | 1790993 A | 6/2006 |
| CN | 101039245 A | 9/2007 |
| CN | 101615967 B | 4/2011 |
| EP | 1657839 A1 | 5/2006 |
| EP | 1737147 A1 | 12/2006 |
| EP | 1826926 A1 | 8/2007 |
| RU | 2310279 C2 | 11/2007 |

OTHER PUBLICATIONS

"G.709/Y.1331—Interfaces for the Optical Transport Network (OTN)," ITU-T Recommendation G.709/Y.1331, Dec. 2009, Telecommunication Standardization Sector of ITU, Geneva, Switzerland.

$1^{st}$ Office Action in corresponding U.S. Appl. No. 12/721,338 (Apr. 20, 2012).

$2^{nd}$ Office Action in corresponding U.S. Appl. No. 12/721,338 (Sep. 7, 2012).

$1^{st}$ Office Action in related U.S. Appl. No. 13/295,613 (Feb. 10, 2012).

$2^{nd}$ Office Action in related U.S. Appl. No. 13/295,613 (Jul. 20, 2012).

Notice of Allowance in related U.S. Appl. No. 13/295,613 (Nov. 9, 2012).

* cited by examiner

METHOD, APPARATUS AND SYSTEM FOR TRANSMITTING AND RECEIVING CLIENT SIGNALS

CROSS-REFERENCE TO RELATED APPLICATIONS

This application is a continuation of U.S. patent application Ser. No. 12/721,338, filed on Mar. 10, 2010, which is a continuation of International Patent Application No. PCT/CN2009/072449, filed on Jun. 25, 2009. The International Application claims priority to Chinese Patent Application No. 200810111493.0, filed on Jun. 26, 2008. The aforementioned patent applications are hereby incorporated by reference in their entireties.

FIELD OF THE INVENTION

The present invention relates to the field of optical network, and particularly, to a method, apparatus and system for transmitting and receiving client signals.

BACKGROUND

As the core technology of the next generation transport networks, the Optical Transport Network (OTN) not only has abundant Operation Administration and Maintenance (OAM), strong Tandem Connection Monitor (TCM) and outband Forward Error Correction (FEC) capability, but also can perform flexible scheduling and management of large volume service, and has increasingly become a major technology of the backbone transport networks.

With the rapid development of types of data service, operators hope the OTN to provide better support to data of multiple services, such as client signals of Ethernet, fiber channel (FC) and Synchronous Digital Hierarchy (SDH), etc.

Conventionally, in the related art, transmission of different types of client signals are realized by using Optical Channel Data Unit-k (ODUk), where k=1, 2, 3, 4. At the transmitting end, a client signal to be transmitted is mapped into the ODUk, an overhead is added to the ODUk to form an Optical Channel Transport Unit-k (OTUk) frame, and the OTUk frame is transferred to the OTN for transmission, where k=1, 2, 3, 4.

However, the inventor finds that, the rates of four ODUk (k=1,2,3,4) are predetermined, with the rate of ODU1 being 2.5G, the rate of ODU2 being 10G, the rate of ODU3 being 40G, and the rate of ODU4 being 112G. In mapping the client signal to be transmitted to the ODUk at the transmitting end, the rate of the ODUk and the rate of the client signal to be transmitted cannot be matched accurately. Thus the bandwidth of OTN transport channel is seriously wasted. Meanwhile, for multiple client signals, the transmitting end has to bundle these multiple client signals together and map them into a single ODUk, which is inconvenient for the OTN to manage each client signal.

SUMMARY OF THE INVENTION

The embodiments of the present invention provides a method, apparatus and system for transmitting and receiving client signals, so that the rate of the client signals and the rate of the ODUk can be accurately matched, the bandwidth of the OTN transport channel can be saved, and a strong management can be achieved for each client signal.

The embodiments of the present invention provide technical solutions as follows:

A method for transmitting client signals, including: (1) mapping a client signal to be transmitted to a corresponding low-order Optical Channel Data Unit (ODU) in a low-order ODU set, where low-order ODUs in the low-order ODU set have rates increased in order, and have rate correspondence relations with the client signals; (2) mapping the low-order ODU to a timeslot of a high-order Optical Channel Payload Unit (OPU) in a high-order OPU set; and (3) adding an overhead to the high-order OPU to form an Optical Channel Transport Unit (OTU), and transferring the OTU to an Optical Transport Network (OTN) for transmission.

An apparatus for transmitting client signals, including: (1) a first mapping unit, configured to map a client signal to be transmitted to a corresponding low-order Optical Channel Data Unit (ODU) in a low-order ODU set, where low-order ODUs in the low-order ODU set have rates increased in order, and have rate correspondence relations with the client signals; (2) a second mapping unit, configured to map the low-order ODU obtained by the first mapping unit to a timeslot of a high-order Optical Channel Payload Unit (OPU) in a high-order OPU set; and (3) a transmitting unit, configured to add an overhead to the high-order OPU obtained by the second mapping unit to form an Optical Channel Transport Unit (OTU), and transfer the OTU to an Optical Transport Network (OTN) for transmission.

A method for receiving client signals, including: (1) receiving a data frame to obtain high-order Optical Channel Payload Units (OPUs) in a high-order OPU set; (2) de-mapping the high-order OPUs to obtain low-order Optical Channel Data Units (ODUs) having rates increased in order in a low-order ODU set; and (2) de-mapping, according to correspondence relations between the client signals and the low-order ODUs in the low-order ODU set, the low-order ODUs in the low-order ODU set to obtain the client signals.

An apparatus for receiving client signals, including: (1) a receiving unit, configured to receive a data frame to obtain high-order Optical Channel Payload Units (OPUs) in a high-order OPU set; (2) a first de-mapping unit, configured to de-map the high-order OPUs to obtain low-order Optical Channel Data Units (ODUs) having rates increased in order in a low-order ODU set; and (3) a second de-mapping unit, configured to de-map, according to correspondence relations between the client signals and the low-order ODUs in the low-order ODU set, the low-order ODUs in the low-order ODU set to obtain the client signals.

A system for communicating client signals, including a transmitting apparatus and a receiving apparatus.

In the embodiments of the present invention, at the transmitting end, a low-order ODU set having rates increased in order is configured, correspondence relations between the client signals to be transmitted and the low-order ODUs in the low-order ODU set are established by rate, and the client signals to be transmitted are mapped into corresponding low-order ODUs in the low-order ODU set. Thus, the rates of the client signals can be accurately matched with the rates of the low-order ODUs in the low-order ODU set, so that the bandwidth of the OTN transport channel can be saved.

In addition, the transmitting end may, based on the correspondence relation between the client signals to be transmitted and the low-order ODUs having rates increased in order in the low-order ODU set, map multiple client signals to corresponding low-order ODUs in the low-order ODU set, then map each low-order ODUs in the low-order ODU set to different timeslots of the high-order OPUs in the high-order OPU set, to be transferred to the OTN through data frame for transmission, so as to facilitate the OTN to manage each client signal. Furthermore, the sub data units in the low-order ODU set employ the identical frame structure, so that a strong management can be achieved for each type of client signal.

DETAILED DESCRIPTION OF THE EMBODIMENTS

The embodiments of the present invention are described in detail below with reference to the drawings.

Figure 1:
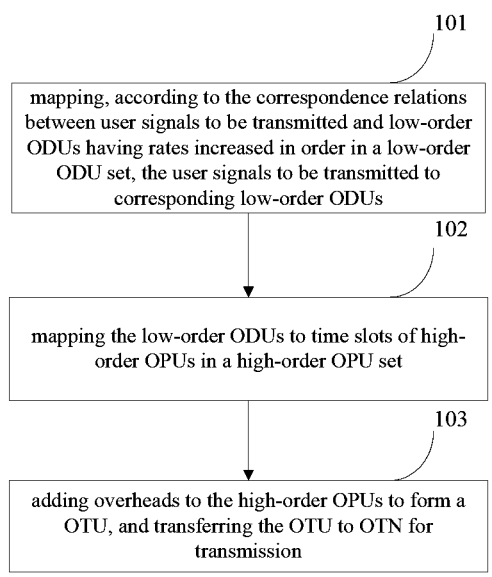
FIG. 1 is a flowchart of a client signal transmitting method according to a first embodiment of the present invention.

Referring to FIG. 1, illustrated is a flowchart of a client signal transmitting method according to a first embodiment of the present invention, which includes:

Step 101: mapping, according to the correspondence relations between client signals to be transmitted and low-order Optical Channel Data Units (ODUs) having rates increased in order in a low-order ODU set, the client signals to be transmitted to corresponding low-order ODUs;

Step 102: mapping the low-order ODUs to timeslots of high-order Optical Channel Payload Units (OPUs) in a high-order OPU set; and Step 103: adding overheads to the high-order OPUs to form an Optical Channel Transport Unit (OTU), and transferring the OTU to an Optical Transport Network (OTN) for transmission.

From the above embodiment, it can be seen that by configuring a low-order ODU set with rates increased in order, and establishing correspondence relations between the client signals and the low-order ODUs in the low-order ODU set by rate, a client signal to be transmitted of any rate can be mapped into a corresponding low-order ODU in the low-order ODU set, besides, the rate of the client signal to be transmitted can be accurately matched with the rate of the low-order ODU in the low-order ODU set, so that the bandwidth of the OTN transport channel can be saved. Meanwhile, multiple client signals are mapped into different low-order ODUs in the low-order ODU set respectively, then the different low-order ODUs in the low-order ODU set are mapped into different timeslots of the high-order OPUs in the high-order OPU set, and are transferred to the OTN through data frame for transmission. In this manner, it is convenient for the OTN to manage each client signal.

Figure 2:
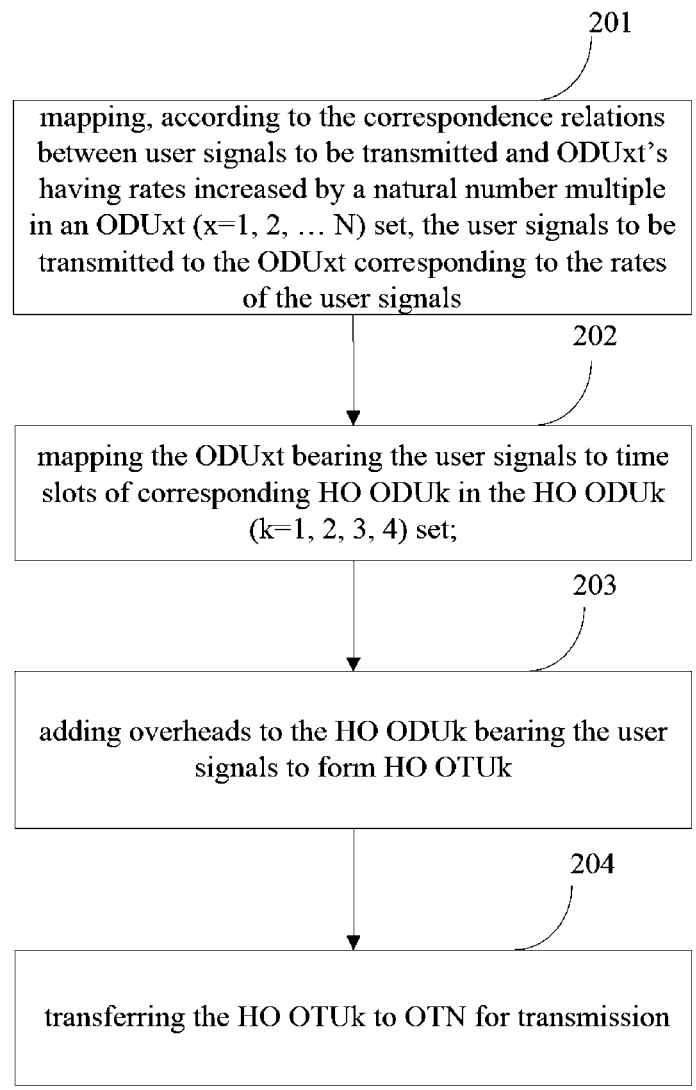
FIG. 2 is a flowchart of a client signal transmitting method according to a second embodiment of the present invention.

Referring to FIG. 2, illustrated is a flowchart of a client signal transmitting method according to a second embodiment of the present invention, which includes:

Step 201: mapping, according to the correspondence relations between client signals to be transmitted and Optical Channel Data Unit-xt (ODUxt) (x=1, 2, ... N) having rates increased by a natural number multiple in an ODUxt set, a client signal to be transmitted to the ODUxt corresponding to the rate of the client signal; where, an ODUxt (x=1, 2, ... N) set having rates increased in order is configured. With respect to a specific client signal, an ODUxt corresponding to the rate of the client signal is selected from the ODUxt (x=1, 2, ... N) set according to the rate of the client signal, and then the client signal is mapped into the ODUxt.

Preferably, in the ODUxt (x=1, 2, ... N) set, the rate of a minimum rate granularity ODU1t is the rate of a minimum timeslot granularity in a High Order Optical Channel Data Unit-k (HO ODUk) (k=1, 2, 3, 4) set, and the embodiments of the present invention do not intend to limit the specific rate of the minimum rate granularity ODU1t in the ODUxt set. Currently, the International Telecommunication Union (ITU) is in discussion about setting a new OTN rate, for HO OPU1, a possible option is setting the rate as 238/227×2.488320 Gbit/s, i.e. about 2.6088993833 Gbit/s. For the new OTN rate, if HO ODU1 is divided into 2 timeslots, the rate of the minimum timeslot granularity in the HO ODUk (k=1, 2, 3, 4) set is half of that of the HO OPU1, i.e. 1.304449692 Gbit/s. Thus the rate of ODU1t is the rate of the minimum timeslot granularity in the HO ODUk (k=1, 2, 3, 4) set, i.e. 1.304449692 Gbit/s. The rate of ODUxt is a natural number multiple of the rate of ODU1t, i.e. x xODU1t (x=1, 2, ... N).

Another possible option is setting the rate of the minimum rate granularity ODU1t in the ODUxt set to be the same as that of ODU0 being currently discussed by the ITU, then ODUxt set will be a set of rates which are increased in order by a multiple of the rate of ODU0. Presently, there are two possible options for the rate of ODU0: about 1.249 Gbit/s or about 1.244 Gbit/s. The adoption of such rate has an advantage of being compatible with the existing ODUk, so that ODU1t can be introduced to all the OTN containers.

The embodiments of the present invention do not intend to limit the frame structure of ODUxt, and preferably, it is suggested that the frame structure defined by G.709 be adopted as the ODUxt frame structure, and that the frequency offset of ODUxt signal also be matched with the current G.709, i.e., +/−20 ppm.

When the rate of ODU1t is 1.304449692 Gbit/s, the correspondence relations between the current client signals and ODUxt are as shown in Table 1.

TABLE 1

Correspondence Relations between the Current Client signals and ODUxt

| Type of Client signal | Rate of Client signal (Gbit/s) | Type of ODUxt | Rate of ODUxt (Gbit/s) |
| --- | --- | --- | --- |
| Fiber Channel | 0.53125 | ODU1t | 1.304449692 |
| FC-1G | 1.065 | ODU1t | 1.304449692 |
| GE | 1.25 | ODU1t | 1.304449692 |
| HDTV | 1.485 | ODU2t | 2.608899383 |
| FC-2G | 2.125 | ODU2t | 2.608899383 |
| STM-16 | 2.488320 | ODU2t | 2.608899383 |
| ODU1 | 2.498775 | ODU2t | 2.608899383 |
| FC-4G | 4.25 | ODU4t | 5.217798767 |
| FC-8G | 8.5 | ODU7t | 9.131147841 |
| STM-64 | 9.95328 | ODU8t | 10.43559753 |
| ODU2 | 10.037273924 | ODU8t | 10.43559753 |
| 10GE LAN | 10.3125 | ODU8t | 10.43559753 |
| FC-10G | 10.52 | ODU9t | 11.74004722 |
| 100GE-5L | 20.625 | ODU16t | 20.87119507 |
| 100GE-4L | 25.78125 | ODU20t | 26.08899383 |
| STM-256 | 39.81312 | ODU31t | 40.43794044 |
| ODU3 | 40.319218983 | ODU31t | 40.43794044 |

TABLE 1-continued

Correspondence Relations between the
Current Client signals and ODUxt

| Type of Client signal | Rate of Client signal (Gbit/s) | Type of ODUxt | Rate of ODUxt (Gbit/s) |
|---|---|---|---|
| 40GE | 41.25 | ODU32t | 41.74239013 |
| 100GE | 103.125 | ODU80t | 104.3559753 |

In order to ensure a full rate transparent transport of the client signal, and in consideration of the requirement for timing transparent transport of synchronous Ethernet, multiple client signals can be regarded as Constant Bit Rate (CBR) client signals. In step 201, each type of CBR client signal can be mapped into corresponding ODUxt, through asynchronous mapping such as Generic Mapping Procedure (GMP) or NJO/PJO asynchronous adjustment. For a packet type client signal, it may be packaged with a Generic Framing Procedure (GFP), and the packaged packet type client signal may be mapped into corresponding ODUxt according to a selected ODUxt bandwidth, by inserting IDEL frames.

Step 202: mapping the ODUxt bearing the client signals to timeslots of corresponding HO ODUk in the HO ODUk (k=1, 2, 3, 4) set; where, if the rate of the minimum timeslot granularity in the HO ODUk (k=1, 2, 3, 4) set is 1.304449692 Gbit/s, the number of timeslots obtained by dividing the HO ODUk in the HO ODUk (k=1, 2, 3, 4) set and their correspondence with the types of ODUxt are shown in the following Table 2.

TABLE 2

Number of Timeslots in HO ODUk and
Correspondence with ODUxt

| Type of HO ODUk | Rate Level | Number of Timeslots | Type of born ODUxt |
|---|---|---|---|
| HO ODU1 | 2.5 G | 2 | ODU1t, ODU2t |
| HO ODU2 | 10 G | 8 | ODU1t, ODU2t . . . ODU8t |
| HO ODU3 | 40 G | 32 | ODU1t, ODU2t . . . ODU32t |
| HO ODU4 | 112 G | 80 | ODU1t, ODU2t . . . ODU80t |

According to Table 2 and taking HO ODU1 as an example, HO ODU1 is divided into 2 timeslots, where one HO ODU1 can bear two ODU1ts or one ODU2t. When one HO ODU1 bears two ODU1ts, each HO ODU1 timeslot bears one ODU1t, and when one HO ODU1 bears one ODUt, the two HO ODU1 timeslots are bound together to form a timeslot group to bear one ODUt jointly.

In step 202, the ODUxt can be mapped into a timeslot or timeslot group of the HO ODUk through synchronous mapping or asynchronous mapping, where the asynchronous mapping can be carried out in a way of NJO/PJO asynchronous adjustment, or in a way of GMP.

Step 203: adding overheads to the HO ODUk bearing the client signals to form HO OTUk.

Step 204: transferring the HO OTUk to the OTN for transmission.

From the above embodiment, it can be seen that an ODUxt (x=1, 2, . . . N) set having rates increased in order is configured at the transmitting end, and correspondence relations between the client signals and the ODUxt in the ODUxt (x=1, 2, . . . N) set are established by rate, thus a client signal of any rate to be transmitted can be mapped into a corresponding ODUxt in the ODUxt (x=1, 2, . . . N) set, besides, the rate of the client signal to be transmitted can be accurately matched with the rate of the ODUxt in the ODUxt (x=1, 2, . . . N) set, so that the bandwidth of the OTN transport channel can be saved. Meanwhile, since the rates of respective ODUxt in the ODUxt (x=1, 2, . . . N) set are increased in order to show a regularity, the mapping of each ODUxt to the HO ODUk does not need a complicated adjustment and can be performed simply. The configured ODUxt (x=1, 2, . . . N) set can be flexibly adapted to each type of client signal, and provide a completely transparent mapping for the client signal. Further, the transmitting end maps multiple client signals to different ODUxts in the ODUxt (x=1, 2, . . . N) set respectively, and transmits the ODUxts after mapping them to different timeslots of the HO ODUk in the HO ODUk (k=1, 2, 3, 4) set, so that it is convenient for the OTN to manage each client signal. In addition, the ODUxts in the ODUxt (k=1, 2, 3, 4) set employ the identical frame structure, so that a strong management can be achieved for each type of client signal.

Figure 3:
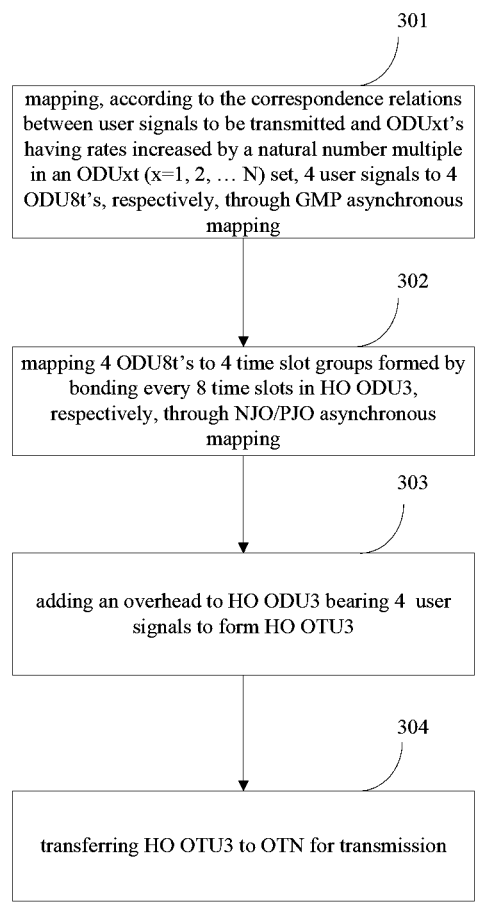
FIG. 3 is a flowchart of a client signal transmitting method according to a third embodiment of the present invention.

A flowchart for a client signal transmitting method according to a third embodiment of the present invention is described in detail with reference to FIG. 3. In the present embodiment, the rate of ODU1t is 1.304449692 Gbit/s, HO ODU1 is divided into 2 timeslots, HO ODU2 is divided into 8 timeslots, HO ODU3 is divided into 32 timeslots, and HO ODU4 is divided into 80 timeslots. Four client signals are to be transmitted, including 2 10GE LAN, 1 STM-64, and 1 ODU2. The method includes:

Step 301: mapping, according to the correspondence relations between client signals to be transmitted and ODUxts having rates increased by a natural number multiple in the ODUxt (x=1, 2, . . . N) set, the 4 client signals to 4 ODU8ts respectively, through GMP asynchronous mapping.

In the present embodiment, the rate of ODU1t is 1.304449692 Gbit/s, therefore 4 client signals are mapped into an ODU8t according to the correspondence relations in Table 1 between the current client signals and the ODUxts in the ODUxt(x=1, 2, . . . N) set, so as to Here, 1 10GE LAN client signal is packed in ODU8t-a, 1 10GE LAN client signal is packed in ODU8t-b, 1 STM-64 client signal is packed in ODU8t-c, and 1 ODU2 client signal The frequency differences between the client signals and the ODU8t can be absorbed by using a GMP mapping method. The mapping method is to calculate a byte number Cn of client signals born by the ODU8t in one frame period, based on the clock relation between the client signals and the ODU8t, then map Cn value to an overhead area of the ODU8t, and maps Cn bytes to the ODU8t by Sigma-Delta algorithm.

Step 302: mapping 4 ODU8ts to 4 timeslot groups formed by bonding every 8 timeslots in HO ODU3, respectively, through NJO/PJO asynchronous mapping.

In step 302, each ODU8t is mapped into a timeslot group formed by bonding 8 timeslots, and therefore the 4 ODU8ts are all mapped into 32 timeslots in HO ODU3.

Step 303: adding an overhead to HO ODU3 bearing the 4 client signals to form HO OTU3.

Step 304: transferring HO OTU3 to the OTN for transmission.

Figure 4:
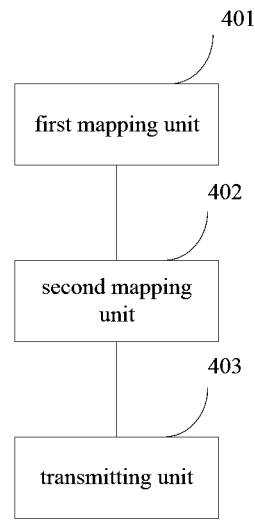
FIG. 4 is a structural diagram of a client signal transmitting apparatus according to a first embodiment of the present invention.

Corresponding to the above described method, an embodiment of the present invention further provides a client signal transmitting apparatus. Referring to FIG. 4, illustrated is a structural diagram of a client signal transmitting apparatus according to a first embodiment of the present invention. The transmitting apparatus in the present embodiment includes a first mapping unit 401, a second mapping unit 402 and a transmitting unit 403. The internal structure and connection relations of the transmitting apparatus are further described below in conjunction with its operating principle.

The first mapping unit 401 is configured to map, according to the correspondence relations between client signals to be transmitted and low-order ODUs having rates increased in order in a low-order ODU set, the client signals to be transmitted to corresponding low-order ODUs.

The second mapping unit 402 is configured to map the low-order ODUs obtained by the first mapping unit 401 to timeslots of high-order OPUs in a high-order OPU set; and The transmitting unit 403 is configured to add overheads to the high-order OPUs obtained by the second mapping unit 402 to form an OTU, and transfer the OTU to OTN for transmission.

From the above embodiment, it can be seen that the first mapping unit maps, according to the correspondence relations between the client signals to be transmitted and low-order ODUs having rates increased in order in the low-order ODU set, a client signal of any rate to be transmitted to a corresponding low-order ODU in the low-order ODU set, thus, the rates of the client signals to be transmitted can be accurately matched with the rates of the low-order ODUs in the low-order ODU set, so that the bandwidth of the OTN transport channel can be saved. Meanwhile, since the rates of the low-order ODUs in the low-order ODU set are increased in order to show a regularity, the mapping of the low-order ODUs in the low-order ODU set to the timeslots of the high-order OPU in the high-order OPU set by the second mapping unit do not need complicated adjustments and can be performed simply. The configured low-order ODU set can be flexibly adapted to each type of client signal, and provide a completely transparent mapping for the client signal. Further, the first mapping unit maps client signals to be transmitted to corresponding low-order ODUs in the low-order ODU set, respectively, then maps the low-order ODUs in the low-order ODU set to different timeslots of the high-order OPUs in the high-order OPU set, to be transferred to the optical transport network OTN through data frame for transmission, so that it is convenient for the OTN to manage each client signal. In addition, the low-order ODUs in the low-order ODU set use the identical frame structure, so that a strong management can be achieved for each type of client signal.

Figure 5:
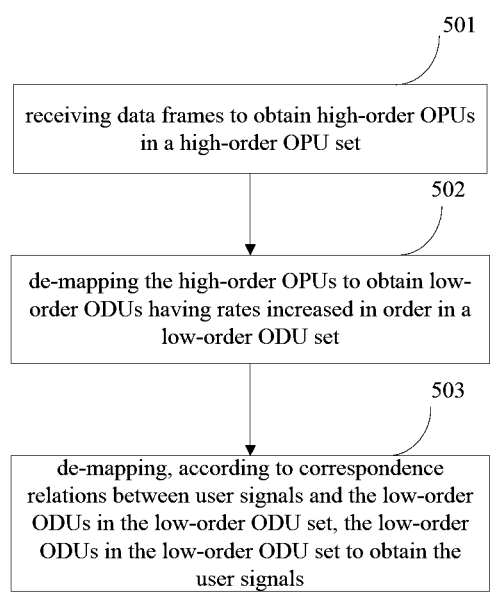
FIG. 5 is a flowchart of a client signal receiving method according to a first embodiment of the present invention.

Referring to FIG. 5, illustrated is a flowchart of a client signal receiving method according to a first embodiment of the present invention, which includes:

Step 501: receiving data frames to obtain high-order OPUs in a high-order OPU set;

Step 502: de-mapping the high-order OPUs to obtain low-order ODUs having rates increased in order in a low-order ODU set; and Step 503: de-mapping, according to correspondence relations between client signals and the low-order ODUs in the low-order ODU set, the low-order ODUs in the low-order ODU set to obtain the client signals.

From the above embodiment, it can be seen that at the receiving end, similarly, a low-order ODU set having rates increased in order is configured, the low-order ODUs in the low-order ODU set are de-mapped according to the correspondence relations between the rates of the client signals to be transmitted and the low-order ODUs in the low-order ODU set, to obtain corresponding client signals born on the low-order ODUs in the low-order ODU set. Accordingly, the rates of the client signals can be accurately matched with the rates of the low-order ODUs in the low-order ODU set, so that the bandwidth of the OTN transport channel can be saved. Meanwhile, since the rates of the low-order ODUs in the low-order ODU set are increased in order to show a regularity, the de-mapping from the high-order OPUs in the high-order OPU set to the low-order ODUs in the low-order ODU set do not need complicated adjustments, and can be performed simply.

Figure 6:
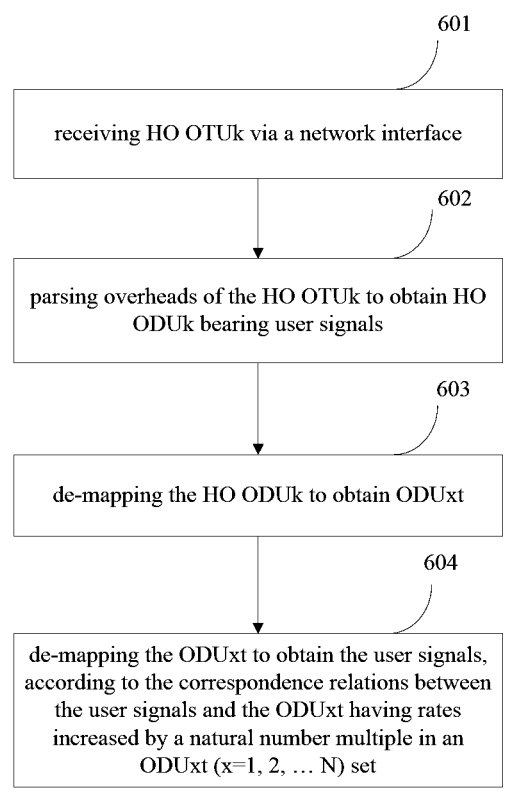
FIG. 6 is a flowchart of a client signal receiving method according to a second embodiment of the present invention.

Referring to FIG. 6, illustrated is a flowchart of a client signal receiving method according to a second embodiment of the present invention, which includes:

Step 601: receiving HO OTUk through a network interface;

Step 602: parsing overheads of the HO OTUk to obtain HO ODUk bearing client signals;

Step 603: de-mapping the HO ODUk to obtain ODUxt; and

Step 604: de-mapping the ODUxt to obtain the client signals, according to the correspondence relations between the client signals and the ODUxt having rates increased by a natural number multiple in an ODUxt (x=1, 2, ... N) set.

From the above embodiment, it can be seen that at the receiving end, similarly, an ODUxt (x=1, 2, ... N) set with rates increased by a natural number multiple is configured. Corresponding client signals born in the ODUxt can be obtained by de-mapping the ODUxt according to the correspondence relations between the rates of the client signals to be transmitted and the ODUxt in the ODUxt (x=1, 2, ... N) set. Thus, the rates of the client signals can be accurately matched with the rates of the ODUxt in the ODUxt (x=1, 2, ... N) set, so that the bandwidth of the OTN transport channel can be saved. Meanwhile, since the rates of the ODUxt in the ODUxt (x=1, 2, ... N) set are increased in order to show a regularity, the de-mapping from the HO ODUk to the ODUxt do not need complicated adjustments, and can be achieved simply.

Figure 7:
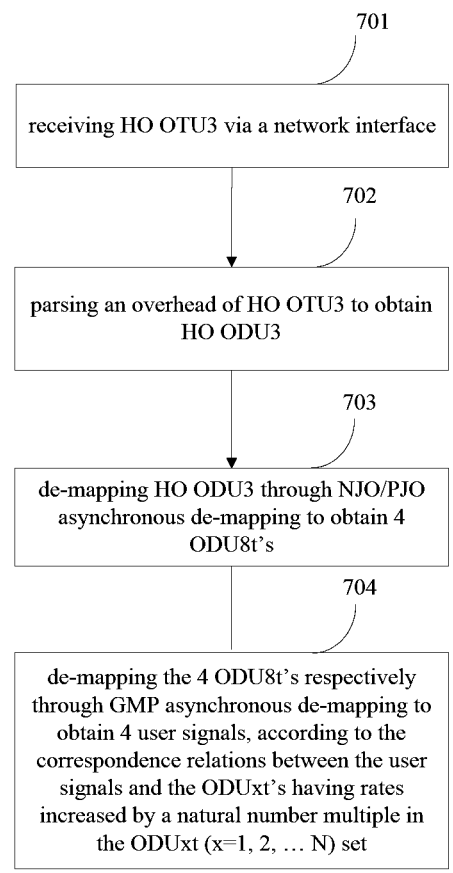
FIG. 7 is a flowchart of a client signal receiving method according to a third embodiment of the present invention.

A flowchart of a client signal receiving method according to a third embodiment of the present invention is described in detail with reference to FIG. 7. The receiving method includes:

Step 701: receiving HO OTU3 through a network interface;

Step 702: parsing an overhead of the HO OTU3 to obtain HO ODU3;

Here the HO ODU3 is divided into 32 timeslots which in turn form 4 timeslot groups, each timeslot group being formed by bonding 8 timeslots. The 4 timeslot groups respectively bear ODU8t-a, ODU8t-b, ODU8t-c and ODU8t-d which are packed with client signals. Here, ODU8t-a is packed with 1 10GE LAN client signal, ODU8t-b is packed with 1 10GE LAN client signal, ODU8t-c is packed with 1 STM-64 client signal, and ODU8t-d is packed with 1 ODU2 client signal.

Step 703: de-mapping the HO ODU3 through NJO/PJO asynchronous de-mapping to obtain 4 ODU8ts;

Step 704: de-mapping the 4 ODU8ts respectively through GMP asynchronous de-mapping to obtain 4 client signals, according to the correspondence relations between the client signals and the ODUxt having rates increased by a natural number multiple in the ODUxt (x=1, 2, ... N) set.

Figure 8:
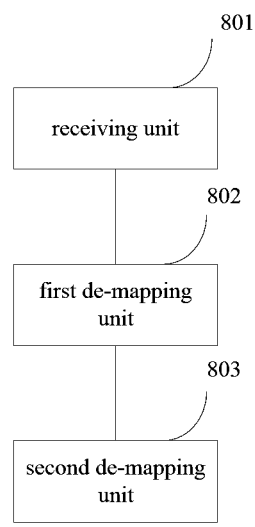
FIG. 8 is a structural diagram of a client signal receiving apparatus according to a first embodiment of the present invention.

Corresponding to the above described method, the embodiments of the present invention further provide a client signal receiving apparatus. Referring to FIG. 8, illustrated is a structural diagram of a client signal receiving apparatus according to a first embodiment of the present invention. The receiving apparatus in the present embodiment includes a receiving unit 801, a first de-mapping unit 802 and a second de-mapping unit 803. The internal structure and connection relations of the receiving apparatus are further described in conjunction with its operating principle.

The receiving unit 801 is configured to receive data frames to obtain high-order OPUs in a high-order OPU set.

The first de-mapping unit 802 is configured to de-map the high-order OPUs to obtain low-order ODUs having rates increased in order in a low-order ODU set.

The second de-mapping unit 802 is configured to de-map, according to the correspondence relations between client signals and the low-order ODUs in the low-order ODU set, the low-order ODUs in the low-order ODU set to obtain the client signals.

In the first embodiment for communication method of the present invention, a client signal communication method is implemented, including the above-mentioned transmitting method and receiving methods, and herein is not described since details are given previously.

Corresponding to the above described method, the present invention further provides a first embodiment of a client signal transmission system, including the previous receiving apparatus and transmitting apparatus, and herein is not described since details are given previously.

The structural elements illustrated in FIGS. 4 and 8 are implemented on one or more general purpose computers or digital processors using standard or proprietary computer operating systems and program codes. For example, the structural elements can be implemented by ASIC, FPGA or programmable chip.

The above described contents are just some exemplary embodiments of the present invention. It should be noted that, a person skilled in the art can make various changes and modifications without deviating from the principle of the present invention, and these changes and modifications shall also be regarded as falling within scope of the present invention.

What is claimed is:

1. A method for transmitting client signals, the method comprising:
   mapping a client signal to a low-order Optical Channel Data Unit (ODU) via a Generic Framing Procedure (GFP) scheme, wherein the low-order ODU is sized to M equal sized timeslots of a high-order Optical Channel Payload Unit-k (OPUk), wherein the high-order OPUk is divided into N equal sized timeslots, wherein M is any one of a number group from 1 to N; wherein if k=2, then N=8, if k=3, then N=32, and if k=4, then N=80;
   mapping the low-order ODU with the client signal to M equal sized timeslots of the high-order OPUk via a Generic Mapping Procedure (GMP) scheme;
   forming an Optical Channel Transport Unit (OTU) with the high-order OPUk and overheads; and
   transmitting the OTU.

2. The method according to claim 1, wherein the size of the low-order ODU is larger than the size of an Optical Channel Data Unit-k-1 (ODUk-1) and less than the size of an Optical Channel Data Unit-k (ODUk).

3. The method according to claim 2, wherein a bit rate of the client signal is larger than a bit rate of the ODUk-1 and less than a bit rate of the ODUk.

4. The method according to claim 1, further comprising:
   mapping a second client signal to a second low-order ODU, wherein the second low-order ODU has a size of L equal sized timeslots of the high-order OPUk, wherein the L+M is equal or less than N; and
   mapping the second low-order ODU to L equal sized timeslots of the high-order OPUk.

5. An apparatus comprising a transmitter configured to couple to a receiver and to transmit client signals to the receiver, wherein the transmitter is configured to:
   map a client signal to a low-order Optical Channel Data Unit (ODU) via a Generic Framing Procedure (GFP) scheme, wherein the low-order ODU is sized to M equal sized timeslots of a high-order Optical Channel Payload Unit-k (OPUk), wherein the high-order OPUk is divided into N equal sized timeslots, wherein M is any one of a number group from 1 to N; wherein if k=2, then N=8, if k=3, then N=32, and if k=4, then N=80;
   map the low-order ODU with the client signal to M equal sized timeslots of the high-order OPUk via a Generic Mapping Procedure (GMP) scheme;
   form an Optical Channel Transport Unit (OTU) with the high-order OPUk and overheads; and
   transmit the OTU.

6. The apparatus according to claim 5, wherein the size of the low-order ODU is larger than the size of an Optical Channel Data Unit-k-1 (ODUk-1) and less than the size of an Optical Channel Data Unit-k (ODUk).

7. The apparatus according to claim 6, wherein a bit rate of the client signal is larger than a bit rate of the ODUk-1 and less than a bit rate of the ODUk.

8. The apparatus according to claim 5, wherein the transmitter is configured to:
   map a second client signal to a second low-order ODU, wherein the second low-order ODU has a size of L equal sized timeslots of the high-order OPUk, wherein the L+M is equal or less than N; and
   map the second low-order ODU to L equal sized timeslots of the high-order OPUk.

9. A system, comprising:
   a transmitter is configured to:
      map a client signal to a low-order Optical Channel Data Unit (ODU) via a Generic Framing Procedure (GFP) scheme, wherein the low-order ODU is sized to M equal sized timeslots of a high-order Optical Channel Payload Unit-k (OPUk), wherein the high-order OPUk is divided into N equal sized timeslots, wherein M is any one of a number group from 1 to N; wherein if k=2, then N=8, if k=3, then N=32, and if k=4, then N=80,
      map the low-order ODU with the client signal to M equal sized timeslots of the high-order OPUk via a Generic Mapping Procedure (GMP) scheme,
      form an Optical Channel Transport Unit (OTU) with the high-order OPUk and overheads, and
      transmit the OTU; and
   a receiver is configured to:
      receive the OTU,
      de-map the OTU to get the low-order ODU, and
      de-map the low-order ODU to get the client signal.

10. The system according to claim 9, wherein the size of the low-order ODU is larger than the size of an Optical Channel Data Unit-k-1 (ODUk-1) and less than the size of an Optical Channel Data Unit-k (ODUk).

11. The apparatus according to claim 10, wherein a bit rate of the client signal is larger than a bit rate of the ODUk-1 and less than a bit rate of the ODUk.

12. The apparatus according to claim 9, wherein the transmitter is further configured to:
   map a second client signal to a second low-order ODU, wherein the second low-order ODU has a size of L equal sized timeslots of the high-order OPUk, wherein the L+M is equal or less than N; and
   map the second low-order ODU to L equal sized timeslots of the high-order OPUk.

* * * * *